United States Patent
Kweon et al.

(10) Patent No.: US 6,864,948 B2
(45) Date of Patent: Mar. 8, 2005

(54) APPARATUS FOR MEASURING DISPENSING AMOUNT OF LIQUID CRYSTAL DROPS AND METHOD FOR MANUFACTURING LIQUID CRYSTAL DISPLAY DEVICE USING THE SAME

(75) Inventors: Hyug Jin Kweon, Kyongsangbuk-do (KR); Hae Joon Son, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/128,439

(22) Filed: Apr. 24, 2002

(65) Prior Publication Data

US 2003/0160933 A1 Aug. 28, 2003

(30) Foreign Application Priority Data

Feb. 22, 2002 (KR) .......................................... 2002-9629

(51) Int. Cl.[7] .............................. G02F 1/13; G01R 31/00
(52) U.S. Cl. ....................................... 349/187; 324/770
(58) Field of Search ................................. 349/187, 153, 349/189, 190; 324/770

(56) References Cited

U.S. PATENT DOCUMENTS

| | | | |
|---|---|---|---|
| 3,978,580 A | 9/1976 | Leupp et al. | 29/886 |
| 4,094,058 A | 6/1978 | Yasutake et al. | 29/592 R |
| 4,653,864 A | 3/1987 | Baron et al. | 349/156 |
| 4,691,995 A | 9/1987 | Yamazaki et al. | 350/331 R |
| 4,775,225 A | 10/1988 | Tsuboyama et al. | 349/155 |
| 5,247,377 A | 9/1993 | Omeis et al. | 359/76 |
| 5,263,888 A | 11/1993 | Ishihara et al. | 445/25 |
| 5,379,139 A | 1/1995 | Sato et al. | 349/155 |
| 5,406,989 A | 4/1995 | Abe | 141/7 |
| 5,499,128 A | 3/1996 | Hasegawa et al. | 349/155 |
| 5,507,323 A | 4/1996 | Abe | 141/31 |
| 5,511,591 A | 4/1996 | Abe | 141/7 |
| 5,539,545 A | 7/1996 | Shimizu et al. | 349/86 |
| 5,548,429 A | 8/1996 | Tsujita | 349/187 |

(List continued on next page.)

FOREIGN PATENT DOCUMENTS

| | | |
|---|---|---|
| EP | 1 003 066 A1 | 5/2000 |
| JP | 51-065656 | 6/1976 |
| JP | 57-38414 | 3/1982 |
| JP | 57-88428 | 6/1982 |
| JP | 58-27126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |

*Primary Examiner*—Tarifur R. Chowdhury
(74) *Attorney, Agent, or Firm*—Morgan, Lewis & Bockius LLP

(57) ABSTRACT

A method and system are used for manufacturing a liquid crystal display device such that a dispensing amount of liquid crystal is measured. The method includes steps of filling liquid crystal into a case portion of a liquid crystal dispenser, assembling the liquid crystal dispenser to set the case portion into the liquid crystal dispenser, setting the liquid crystal dispenser in a testing apparatus, testing dispensing characteristics of the liquid crystal dispenser, mounting the liquid crystal dispenser on a liquid crystal dispensing unit of a production line after the testing the dispensing characteristics, dispensing the liquid crystal from the liquid crystal dispenser onto a first substrate of the liquid crystal display device disposed beneath the mounted liquid crystal dispenser, and assembling the first substrate with a second substrate to form a liquid crystal display device. By testing dispensing characteristics of the liquid crystal dispenser, it can be determined whether the liquid crystal dispenser is assembled correctly.

18 Claims, 4 Drawing Sheets

U.S. PATENT DOCUMENTS

| | | | |
|---|---|---|---|
| 5,642,214 A | 6/1997 | Ishii et al. ............... 349/96 |
| 5,680,189 A | 10/1997 | Shimizu et al. ............ 349/123 |
| 5,742,370 A | 4/1998 | Kim et al. ................ 349/124 |
| 5,757,451 A | 5/1998 | Miyazaki et al. .......... 349/106 |
| 5,852,484 A | 12/1998 | Inoue et al. ............... 349/86 |
| 5,854,664 A | 12/1998 | Inoue et al. ............... 349/92 |
| 5,861,932 A | 1/1999 | Inata et al. ............... 349/156 |
| 5,875,922 A | 3/1999 | Chastine et al. ............. 222/1 |
| 5,952,676 A | 9/1999 | Sato et al. ................. 257/59 |
| 5,956,112 A | 9/1999 | Fujimori et al. .......... 349/156 |
| 6,001,203 A | 12/1999 | Yamada et al. ............ 156/106 |
| 6,011,609 A | 1/2000 | Kato et al. ................ 349/190 |
| 6,016,178 A | 1/2000 | Kataoka et al. ........... 349/117 |
| 6,016,181 A | 1/2000 | Shimada ................... 349/156 |
| 6,055,035 A | 4/2000 | Von Gutfeld et al. ...... 349/187 |
| 6,163,357 A | 12/2000 | Nakamura ................. 349/155 |
| 6,219,126 B1 | 4/2001 | Von Gutfeld ............... 349/153 |
| 6,226,067 B1 | 5/2001 | Nishiguchi et al. ........ 349/155 |
| 6,236,445 B1 | 5/2001 | Foschaar et al. .......... 349/156 |
| 6,304,306 B1 | 10/2001 | Shiomi et al. ............... 349/88 |
| 6,304,311 B1 | 10/2001 | Egami et al. ............... 349/189 |
| 6,337,730 B1 | 1/2002 | Ozaki et al. ............... 349/156 |
| 6,414,733 B1 | 7/2002 | Ishikawa et al. ........... 349/110 |
| 2001/0021000 A1 | 9/2001 | Egami ...................... 349/187 |
| 2001/0026348 A1 * | 10/2001 | Murata et al. ............. 349/187 |
| 2003/0063251 A1 * | 4/2003 | Murata et al. ............. 349/189 |

FOREIGN PATENT DOCUMENTS

| | | |
|---|---|---|
| JP | 5-127179 | 5/1993 |
| JP | 5-154923 A | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | 8-95066 | 4/1996 |
| JP | 8-101395 A | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-326922 A | 11/1999 |
| JP | 11-344714 | 12/1999 |
| JP | 2000-2879 A | 1/2000 |
| JP | 2000-29035 | 1/2000 |
| JP | 2000-56311 A | 2/2000 |
| JP | 2000-66165 A | 3/2000 |
| JP | 2000-137235 A | 5/2000 |
| JP | 2000-147528 A | 5/2000 |
| JP | 2000-193988 A | 7/2000 |
| JP | 2000-241824 A | 9/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-338501 A | 12/2000 |
| JP | 2001-5401 A | 1/2001 |
| JP | 2001-5405 A | 1/2001 |
| JP | 2001-13506 A | 1/2001 |
| JP | 2001-33793 A | 2/2001 |
| JP | 2001-42341 A | 2/2001 |
| JP | 2001-51284 A | 2/2001 |
| JP | 2001-66615 A | 3/2001 |
| JP | 2001-91727 A | 4/2001 |
| JP | 2001-117105 | 4/2001 |
| JP | 2001-117109 A | 4/2001 |
| JP | 2001-133745 A | 5/2001 |
| JP | 2001-133794 | 5/2001 |
| JP | 2001-133799 A | 5/2001 |
| JP | 2001-142074 | 5/2001 |
| JP | 2001-147437 | 5/2001 |
| JP | 2001-154211 | 6/2001 |
| JP | 2001-166272 A | 6/2001 |
| JP | 2001-166310 A | 6/2001 |
| JP | 2001-183683 A | 7/2001 |
| JP | 2001-201750 A | 7/2001 |
| JP | 2001-209052 A | 8/2001 |
| JP | 2001-209060 A | 8/2001 |
| JP | 2001-215459 A | 8/2001 |
| JP | 2001-222017 A | 8/2001 |
| JP | 2001-235758 A | 8/2001 |
| JP | 2001-255542 | 9/2001 |
| JP | 2001-264782 | 9/2001 |
| JP | 2001-272640 A | 10/2001 |
| JP | 2001-281675 A | 10/2001 |
| JP | 2001-281678 A | 10/2001 |
| JP | 2001-282126 A | 10/2001 |
| JP | 2001-305563 A | 10/2001 |
| JP | 2001-330837 A | 11/2001 |
| JP | 2001-330840 | 11/2001 |
| JP | 2001-356353 A | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 2000-0035302 A | 6/2000 |

* cited by examiner

APPARATUS FOR MEASURING DISPENSING AMOUNT OF LIQUID CRYSTAL DROPS AND METHOD FOR MANUFACTURING LIQUID CRYSTAL DISPLAY DEVICE USING THE SAME

This application claims the benefit of the Korean Application No. P2002-9629 filed on Feb. 22, 2002, which is hereby incorporated by reference.

BACKGROUND OF THE INVENTION

1. Field of the Invention

The present invention relates to an apparatus for measuring a dispensing amount of liquid crystal drops and a method for manufacturing a liquid crystal display device by using the same.

2. Background of the Related Art

With rapid development of an information-oriented society, an urgent need has arose for an information display device having high-performance characteristics, such as good image quality, light weight, small thickness, and low power consumption. To meet this need, much research has been directed toward various flat panel display devices, such as Liquid Crystal Display Device (LCD), Plasma Display Panel (PDP), Electro Luminescent Display (ELD), Vacuum Fluorescent Display(VFD), and so on. Some of these display technologies have already been employed in various apparatuses as the information display device.

Of these flat panel display types, LCDs are the most widely used since such displays meet the above-noted high-performance characteristics. In displays for mobile devices such as for notebook computers, LCD technology has replaced CRT (Cathode Ray Tube) technology. In addition, for desktop displays such as PC monitor and TV sets, LCD technology has been developed and may soon replace CRT technology.

The LCD is manufactured through an array process for forming bus lines or switching devices (in a case of an active matrix type) such as thin film transistor (TFT) on one substrate (TFT substrate), color filter (CF) process for forming color filter on another substrate (CF substrate), cell process for assembling both substrates into unit panels, and module process for assembling a driver IC or a back light.

A liquid crystal cell process is a process to assemble a TFT substrate and a CF substrate prepared by the array process and the color filter process, respectively. Generally an empty cell is formed with a fixed thin gap between the first substrate and the second substrate then, liquid crystal is filled through an opening around the gap, thereby forming a liquid crystal panel.

Before filling a liquid crystal into an empty cell, an assembling process step is carried out. In the assembling process, the TFT substrate having the TFT arrays formed thereon, and the color filter substrate having color filters formed thereon and opposite to the TFT substrate, are assembled into a panel (empty cell) using a sealing material. For filling a liquid crystal into the empty cell, a liquid crystal vacuum filling method is used. The liquid crystal and the empty cell are loaded in a vacuum chamber, a filling hole around the sealing material in the empty cell is dipped into the liquid crystal. Then, an inside of the vacuum chamber is restored to atmospheric pressure, thereby filling the liquid crystal into the empty cell.

FIG. 1 is a drawing for explaining the liquid crystal filling process step using the related art vacuum filling method applied thereto.

Referring to FIG. 1, a liquid crystal 25 is disposed in a container 30 placed in a chamber 20. The chamber 20 is maintained in a vacuum state to remove moisture and air dissolved in the liquid crystal 25 or contained inside the container 25.

Then, to fill the liquid crystal 25 through liquid crystal filling holes by a pressure difference between a pressure in the cells 40 and a pressure in the chamber 20, the liquid crystal filling holes in empty cells 40 are dipped into the container 30 and brought into contact with the liquid crystal 25. Then, the chamber 20 is brought from higher vacuum state to lower vacuum state and eventually to atmospheric pressure state by introducing nitrogen gas $N_2$ into the chamber 20. Next, after finishing filling of the liquid crystal 25 into empty cells 40, the liquid crystal filling holes are sealed, and the filled liquid crystal cells are cleaned.

However, the liquid crystal filling method has poor productivity because the method requires a long time for liquid crystal filling when the liquid crystal 25 is filled into the empty cells 40. The method requires cutting of a large assembled panel into unit panels (that is, empty cells 40), dipping of a part of the unit cells 40 into the container 30, and bringing the liquid crystal filling holes into contact with the liquid crystal 25 under vacuum. Moreover, a large sized LCD is liable to have some defects due to imperfect filling of the liquid crystal 25 into the cells 40.

As a result, a liquid crystal dropping method has been developed, in which a fixed amount of the liquid crystal is dropped and dispensed into a main sealing area formed around the TFT substrate onto an inner surface of the TFT substrate, and then the TFT substrate and the CF substrate are assembled into a large liquid crystal panel in a vacuum chamber.

The liquid crystal cell process using the liquid crystal dropping method can be explained briefly as follows.

Referring to FIG. 2, after carrying out an orientation step (1S) in which an orientation material is coated on the TFT substrate and the CF substrate, and a mechanical rubbing is carried out on both substrates for orienting molecules of the liquid crystal material, the TFT substrate and the color filter substrate are cleaned (2S). The TFT substrate is provided with a plurality of gate lines running in one direction at fixed intervals, and a plurality of data lines running in the other direction perpendicular to the gate lines at fixed intervals, a plurality of thin film transistors and pixel electrodes in a matrix pixel region defined by the gate lines and the data lines. The CF substrate is provided with a black matrix layer for shielding a light leakage of parts except the pixel region, a color filter layer, and a common electrode.

Then, the cleaned CF substrate is loaded on a stage of a seal dispenser, and a sealing material is coated on a periphery of unit panel areas on the CF substrate (3S). The sealing material may be a photo-sensitive resin, or thermo-curing resin. Meanwhile, no liquid crystal filling hole is required.

At the same time, the cleaned TFT substrate is loaded onto a stage of a silver (Ag) dispenser, and a silver paste material is dropped onto a common voltage supply line on the TFT substrate in the form of a dot (5S). Then, the TFT substrate is transferred to an LC dispenser, and a liquid crystal material is dropped onto an active array region of each panel (6S).

The liquid crystal dropping process is then carried out as follows. After a liquid crystal material is contained into an LC syringe before the LC syringe is assembled and set, air dissolved in the liquid crystal material is removed under a vacuum state, and the liquid crystal syringe is assembled into and set into, and mounted on the liquid crystal dispenser. When the TFT substrate is loaded on a stage of the liquid crystal dispenser, the liquid crystal material is dropped thereon using the liquid crystal syringe (6S), by dispensing a fixed amount of the liquid crystal material onto the TFT substrate with defined pitches inside of a coating area of the sealing material (the pixel region).

After the TFT substrate and the CF substrate are loaded into a vacuum assembling chamber, the TFT substrate and the CF substrate are assembled into a liquid crystal panel such that the dropped liquid crystal is uniformly spread over unit panel areas formed in the liquid crystal panel (7S). Then, the sealing material is cured (7S). The assembled TFT substrate and color filter substrate, that is, a large liquid crystal panel, is cut into individual unit panels (8S). Each unit panel is ground and inspected (9S), thereby completing manufacturing of the LCD unit panel.

However, the related art method for manufacturing a liquid crystal display device having the liquid crystal dropping method applied thereto has the following problems.

In the liquid crystal dropping method, controlling a dispensing amount of the liquid crystal onto the substrate is very important. If the dispensing amount of the liquid crystal is insufficient, air holes may be formed. If the dispensing amount of the liquid crystal is excessive, non-uniform display may result.

The liquid crystal is dropped and dispensed from a syringe in the liquid crystal dispenser onto substrates. After the syringe containing the liquid crystal is assembled and set, and it is mounted on the liquid crystal dispenser, it is made sure if assembling and setting of the syringe is properly done by measuring a dispensing amount of the liquid crystal drops before the liquid crystal is dropped and dispensed onto the substrate. Thus, the dispensing amount can be ensured to be within a proper error range.

As explained above, the proper assembling and setting of the syringe can be made sure after the syringe is mounted on the LC dispenser. Therefore, if it is detected that the syringe is assembled and set incorrectly, there is much inconvenience and a delay of time, because the syringe must be taken out of the LC dispenser, re-assembled and mounted again on the LC dispenser again. This inconvenience and delay can result in decreased productivity of a manufacturing line.

SUMMARY OF THE INVENTION

Accordingly, the present invention is directed to an apparatus for measuring a dispensing amount of liquid crystal drops and a method for manufacturing a liquid crystal display device by using the same that substantially obviates one or more of the problems due to limitations and disadvantages of the related art.

An object of the present invention is to provide an apparatus and method for manufacturing a liquid crystal display that prevents costly delays due to a liquid crystal syringe being mounted on a production line with improper dispensing characteristics or improper assembly of the liquid crystal syringe being dispensed. Another object of the present invention is to improve efficiency in manufacturing a liquid crystal display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages in accordance with the purpose of the present invention, as embodied and broadly described, a method for manufacturing a liquid crystal display device comprises the steps of filling liquid crystal into a case portion of a liquid crystal dispenser; assembling the liquid crystal dispenser to set the case portion into the liquid crystal dispenser; setting the liquid crystal dispenser in a testing apparatus; testing dispensing characteristics of the liquid crystal dispenser to determine whether the liquid crystal dispenser is assembled correctly; after the testing step, mounting the liquid crystal dispenser on a liquid crystal dispensing unit of a production line; dispensing the liquid crystal from the liquid crystal dispenser onto a first substrate of the liquid crystal display disposed beneath the mounted liquid crystal dispenser; and assembling the first substrate with a second substrate to form a liquid crystal display.

In another aspect, a system for manufacturing a liquid crystal display device comprises means for filling liquid crystal into a case portion of a liquid crystal dispenser, assembling the liquid crystal dispenser to set the case portion into the liquid crystal dispenser, means for holding an assembled liquid crystal dispenser having the filled case portion, means for testing dispensing characteristics of the liquid crystal dispenser to determine whether the liquid crystal dispenser is assembled correctly; means for dispensing the liquid crystal onto a first substrate of the liquid crystal display device, the dispensing means receiving the tested liquid crystal dispenser such that the first substrate is disposed beneath the liquid crystal dispenser; and means for assembling the first substrate with a second substrate to form a liquid crystal display device.

In another aspect, an apparatus for measuring a dispensing amount of a liquid crystal from a liquid crystal syringe dispenser comprises a column to support the liquid crystal syringe dispenser; a container to receive liquid crystal drops dispensed from the liquid crystal syringe dispenser; a measuring system to measure an amount of the liquid crystal drops contained in the container; and a processing system interconnected with the measuring system to receive a data related to the measured amount of the liquid crystal drops and to assess functionality of the liquid crystal syringe, wherein the processing system assesses functionality of the liquid crystal syringe dispenser before mounting the liquid crystal syringe in a production line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
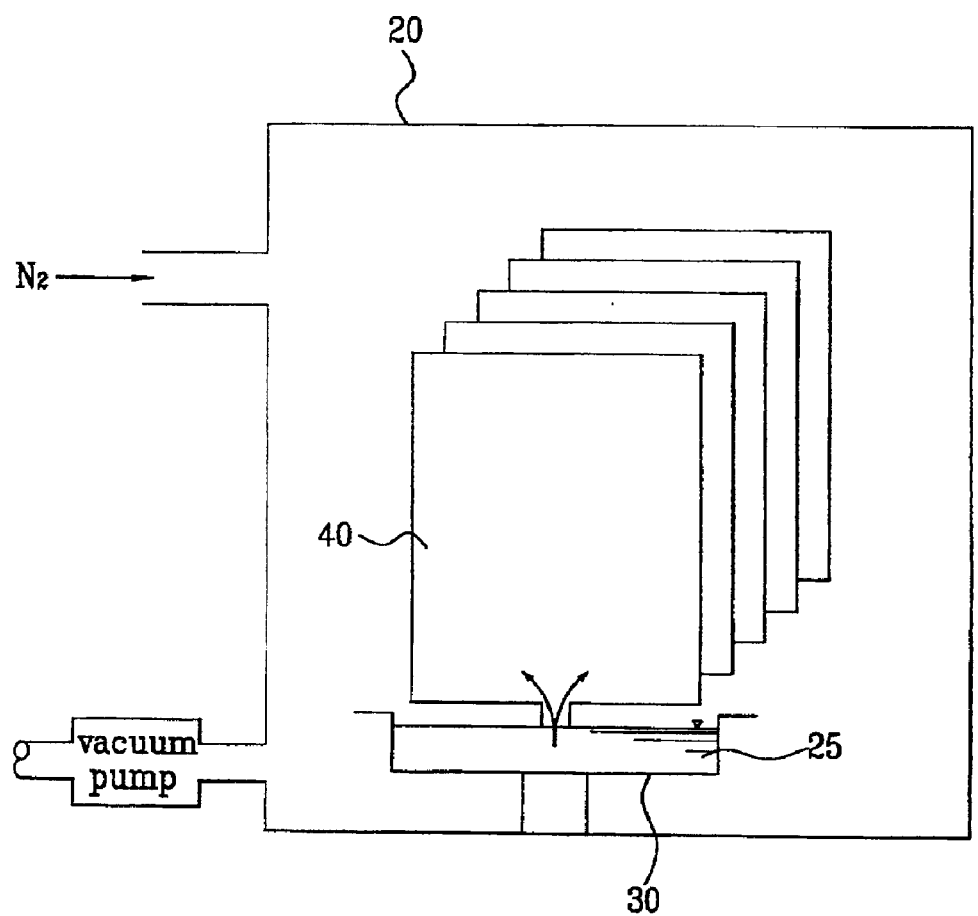
FIG. 1 is a perspective view showing a related art vacuum filling system.
Figure 2:
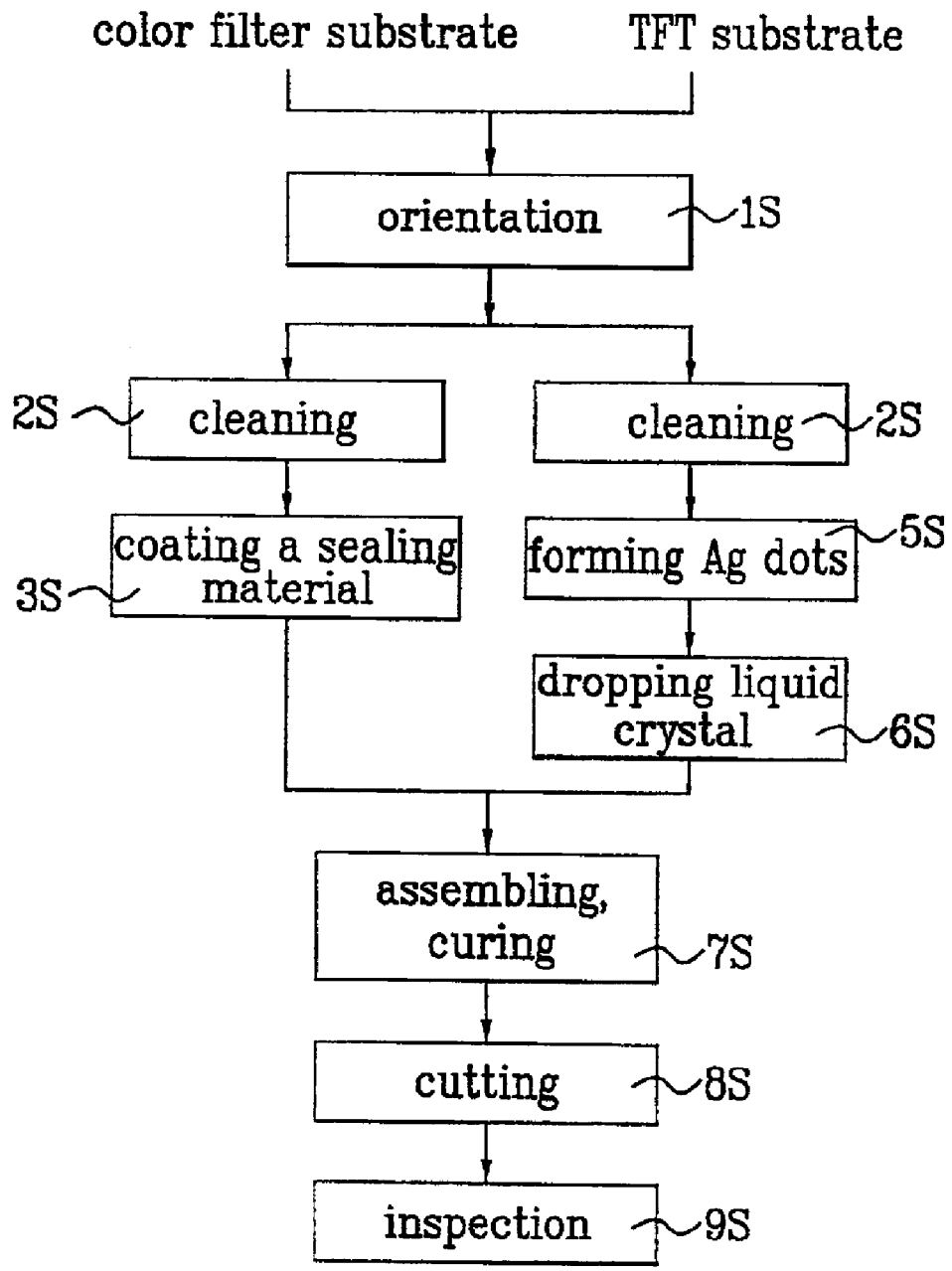
FIG. 2 is a flow chart showing the process steps of a related art liquid crystal dropping method.
Figure 3:
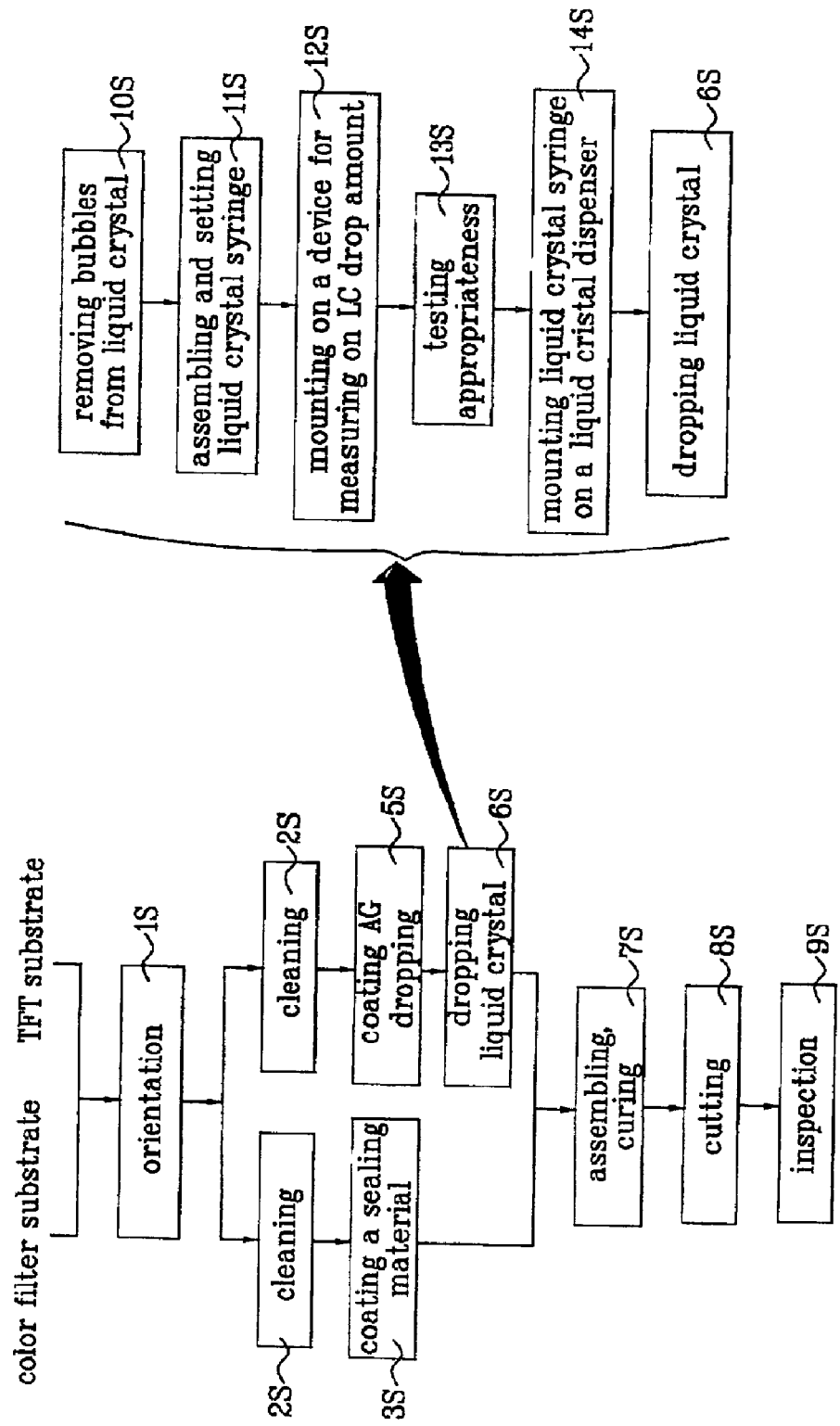
FIG. 3 is a flow chart showing the process steps of a method for manufacturing a liquid crystal display device in accordance with an embodiment of the present invention.
Figure 4:
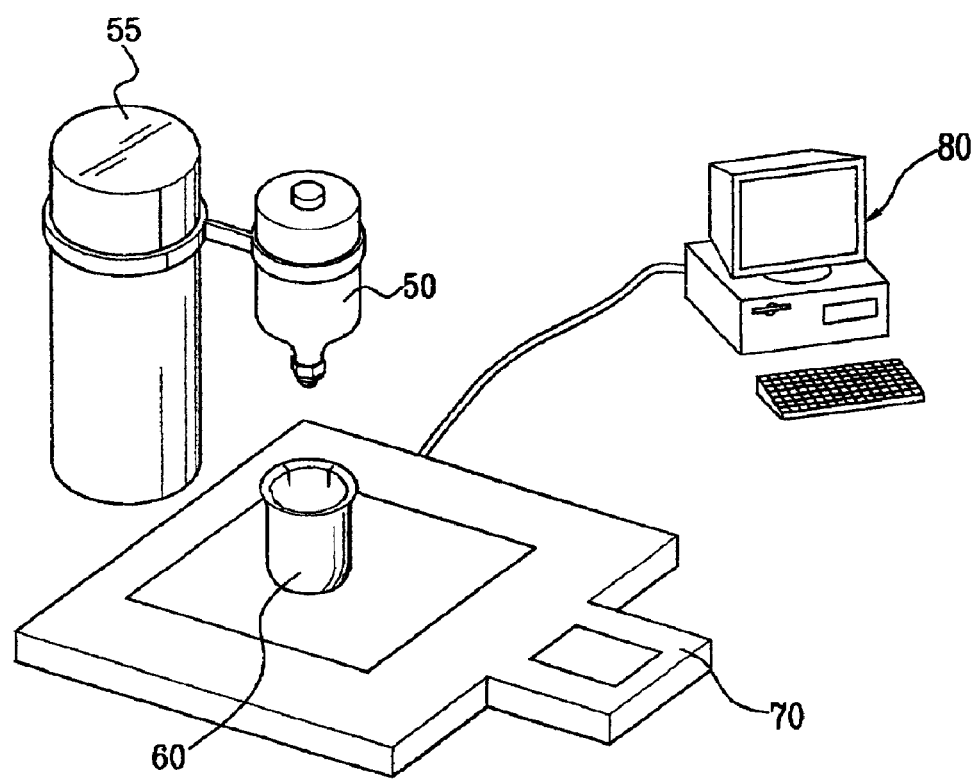
FIG. 4 is a perspective view showing an apparatus for measuring a dispensing amount of liquid crystal drops in FIG. 3.

FIG. 3 illustrates a flow chart showing the process steps of a method for manufacturing a liquid crystal display device in accordance with an embodiment of the present invention, and FIG. 4 illustrates a perspective view for explaining the apparatus for measuring a dispensing amount of the liquid crystal drops in FIG. 3. Process steps of the present invention similar to those of FIG. 2 are identified by the same reference symbols.

Referring to FIG. 3, a first substrate and a second substrate are provided. The first substrate (hereafter called as a "TFT substrate") includes a plurality of gate lines running in one direction at fixed intervals, a plurality of data lines running in the other direction perpendicular to the gate lines at fixed intervals, a plurality of thin film transistors and pixel electrodes in a matrix pixel region defined by the gate lines and the data lines, formed thereon. The second substrate (hereafter called as a "color filter substrate") includes a black matrix layer for shielding a light incident to parts except the pixel region, a color filter layer, and a common electrode.

The liquid crystal cell process will be explained in detail as follows.

An orientation step (1S) is carried out for both of the TFT substrate and the color filter substrate. The orientation step is in order of cleaning before coating the orientation film, printing the orientation film, baking the orientation film, inspecting the orientation film, and rubbing.

Then, the color filter substrate is cleaned (2S). The cleaned color filter substrate is loaded on a stage of a seal dispenser, and a sealing material is coated on a periphery of unit panel areas in the color filter substrate (3S). The sealing material may be a photo-sensitive resin, or thermo-curing resin. However, no liquid crystal filling hole is required.

At the same time, the cleaned TFT substrate is loaded on a stage of a silver (Ag) dispenser, and a silver paste material is dispensed onto a common voltage supply line on the TFT substrate in the form of a dot (5S). Then, the TFT substrate is transferred to a LC dispenser, and a liquid crystal material is dropped onto an active array region of each unit panel area in the TFT substrate (6S).

Of course, the present invention is not limited to this configuration. For example, the coating of the sealing material may be either on the TFT substrate or the color filter substrate. The silver dot may be omitted for the production of an IPS (In-Plane Switching) mode LCD in which both the pixel electrodes and the common electrode are formed on the TFT substrate only.

The liquid crystal dropping process will now be described as follows.

After a liquid crystal material is contained into an LC syringe before the LC syringe is assembled and set, air dissolved in the liquid crystal material is removed under a vacuum state (10S), and the liquid crystal syringe is assembled and set (11S). The LC syringe is then mounted on an apparatus for measuring a dispensing amount of liquid crystal drops (12S).

Referring to FIG. 4, the apparatus for measuring a dispensing amount of liquid crystal drops includes a liquid crystal syringe 50, a column 55 for supporting the liquid crystal syringe 50, a container 60 for containing the liquid crystal dispensed from the liquid crystal syringe 50, a measuring part 70 for measuring a dispensed amount of the liquid crystal drops, and a monitoring part 80 for receiving a data from the measuring part 70 and determining functionality of the liquid crystal syringe.

The proper function of the assembled and set liquid crystal syringe 50 is determined by the apparatus for measuring a dispensing amount of liquid crystal drops (13S). Proper function is determined such that, for example, a dispensing amount of the unit liquid crystal drop is displayed on the monitoring part 80 in milligrams, and, if the dispensing amount of the unit liquid crystal drop is out of a preset range of an error (for example, ±1%), assembling, setting, and testing of the liquid crystal syringe is repeated until the amount is within the preset error range.

As a result of the foregoing repeated test, if the amount is within the preset range of error, the assembled and set LC syringe having liquid crystal filled therein and the parts for controlling dispensing of the liquid crystal in the liquid crystal syringe are determined to be good. Once assembled and set the liquid crystal syringe is determined to be good according to the functionality determination of the liquid crystal syringe, the liquid crystal syringe is mounted on the liquid crystal dispenser of the production line (14S).

Then, when the substrate is loaded onto a stage of the liquid crystal dispenser, the liquid crystal is dropped onto the substrate using the liquid crystal syringe (6S), by making uniform dotting of a preset dispensing amount of the liquid crystal drop onto the TFT substrate with defined pitches inside of a coating area of the sealing material (pixel region).

The functionality determination of the assembled and set liquid crystal syringe may be made again by measuring a dispensing amount of the liquid crystal drop by using a container in the liquid crystal dispensing system before actual dispensing of the liquid crystal on the substrate.

After the TFT substrate and the CF substrate are loaded into a vacuum assembling chamber, the TFT substrate and the CF substrate are assembled into a liquid crystal panel such that the dropped liquid crystal is uniformly spread over unit panel areas in the liquid crystal panel (7S). Then, the sealing material is cured (7S). The assembled TFT substrate and color filter substrate (which is a large panel) is cut into individual unit panels (8S). Each unit panel is ground and inspected (9S), thereby completing manufacturing of the LCD unit panel.

As has been explained, the apparatus for measuring a dispensing amount of a liquid crystal drops and the method for manufacturing a liquid crystal display device by using the same of the present invention has numerous advantages. For example, by progressing the liquid crystal cell process step after making sure of appropriateness of assembled and set states of the liquid crystal syringe using an independent apparatus for measuring a dispensed amount of liquid crystal drops before mounting the liquid crystal syringe on the liquid crystal dispenser in the production line, we can prevent the inconvenience and time delay of the manufacturing process causing by ensuring the functionality of the liquid crystal syringe after it is mounted on the liquid crystal dispenser in a state where the liquid crystal syringe is completely assembled and set. Thus, a working environment and a time efficiency can be maximized, thereby increasing a production yield.

It will be apparent to those skilled in the art that various modifications and variations can be made in the apparatus for measuring a dispensing amount of a liquid crystal drops and the method for manufacturing a liquid crystal display device by using the same of the present invention without departing from the spirit or scope of the invention. Thus, it is intended that the present invention cover the modifications and variations of this invention provided they come within the scope of the appended claims and their equivalents.

What is claimed is:

1. A method for manufacturing a liquid crystal display device, comprising the steps of:
    filling liquid crystal into a case portion of a liquid crystal dispenser;
    assembling the liquid crystal dispenser to set the case portion into the liquid crystal dispenser;
    setting the liquid crystal dispenser in a testing apparatus;
    testing dispensing characteristics of the liquid crystal dispenser to determine whether the liquid crystal dispenser is assembled correctly;
    after the testing step, mounting the liquid crystal dispenser on a liquid crystal dispensing unit of a production line;
    dispensing the liquid crystal from the liquid crystal dispenser onto a first substrate of the liquid crystal display disposed beneath the mounted liquid crystal dispenser; and
    assembling the first substrate with a second substrate to form a liquid crystal display.

2. The method according to claim 1, wherein the testing step includes the steps of: dispensing the liquid crystal from the liquid crystal dispenser into a receiving member; measuring an amount of the liquid crystal dispensed into the receiving member; and comparing the measured amount of liquid crystal with a comparison value to determine whether the liquid crystal dispenser is assembled correctly.

3. The method according to claim 2, wherein the measuring step includes measuring a mass of the liquid crystal dispensed into the receiving member.

4. The method according to claim 2, wherein the testing step includes dispensing a predetermined number of liquid crystal drops from the liquid crystal dispenser into the receiving member.

5. The method according to claim 4, wherein the testing step includes measuring a mass of the predetermined number of liquid crystal drops dispensed from the liquid crystal dispenser.

6. The method according to claim 1, further comprising the step of removing air from the liquid crystal.

7. The method according to claim 1, further comprising a second testing step of the liquid crystal dispenser after the liquid crystal dispenser is mounted in the liquid crystal dispensing unit of the production line.

8. The method according to claim 1, wherein the liquid crystal dispenser is a liquid crystal syringe dispenser.

9. A system for manufacturing a liquid crystal display device, comprising:
    means for filling liquid crystal into a case portion of a liquid crystal dispenser;
    means for assembling the liquid crystal dispenser to set the case portion into the liquid crystal dispenser;
    means for holding an assembled liquid crystal dispenser having the filled case portion;
    means for testing dispensing characteristics of the liquid crystal dispenser to determine whether the liquid crystal dispenser is assembled correctly;
    means for dispensing the liquid crystal onto a first substrate of the liquid crystal display device, the dispensing means receiving the tested liquid crystal dispenser such that the first substrate is disposed beneath the liquid crystal dispenser; and
    means for assembling the first substrate with a second substrate to form a liquid crystal display device.

10. The system according to claim 9, wherein the testing means dispenses the liquid crystal from the liquid crystal dispenser into a receiving member, measures an amount of the liquid crystal dispensed into the receiving member, and compares the measured amount of liquid crystal with a comparison value to determine whether the liquid crystal dispenser is assembled correctly.

11. The system according to claim 10, wherein the testing means measures a mass of the liquid crystal dispensed into the receiving member.

12. The system according to claim 10, wherein the testing means dispenses a predetermined number of liquid crystal drops from the liquid crystal dispenser into the receiving member.

13. The system according to claim 12, wherein the testing means measures a mass of the predetermined number of liquid crystal drops dispensed from the liquid crystal dispenser.

14. The system according to claim 13, further comprising means for removing air from the liquid crystal prior to testing the liquid crystal dispenser.

15. The system according to claim 9, wherein the liquid crystal dispenser is a liquid crystal syringe dispenser.

16. An apparatus for measuring a dispensing amount of a liquid crystal from a liquid crystal syringe dispenser, comprising:
    a column to support the liquid crystal syringe dispenser;
    a container to receive liquid crystal drops dispensed from the liquid crystal syringe dispenser;
    a measuring system to measure an amount of the liquid crystal drops contained in the container; and
    a processing system interconnected with the measuring system to receive a data related to the measured amount of the liquid crystal drops and to assess functionality of the liquid crystal syringe,
    wherein the processing system assesses functionality of the liquid crystal syringe dispenser before mounting the liquid crystal syringe in a production line.

17. The apparatus according to claim 16, wherein the processing system compares data from the measuring system representing a measured value with a comparison value to determine if the measured value is within an error range.

18. The apparatus according to claim 16, wherein the measuring system includes a balance to measure a mass of the liquid crystal received into the container.

* * * * *